(12) United States Patent
Carpenter

(10) Patent No.: US 7,223,719 B1
(45) Date of Patent: *May 29, 2007

(54) BREAKER COMPOSITION AND PROCESS

(75) Inventor: Joel F. Carpenter, Baton Rouge, LA (US)

(73) Assignee: Albemarle Corporation, Richmond, VA (US)

( * ) Notice: Subject to any disclaimer, the term of this patent is extended or adjusted under 35 U.S.C. 154(b) by 178 days.

This patent is subject to a terminal disclaimer.

(21) Appl. No.: 10/802,349

(22) Filed: Mar. 16, 2004

(51) Int. Cl.
C09K 8/66 (2006.01)

(52) U.S. Cl. .................. 507/277; 507/269; 507/276; 507/922; 166/308.3

(58) Field of Classification Search .............. None
See application file for complete search history.

(56) References Cited

U.S. PATENT DOCUMENTS

| | | | |
|---|---|---|---|
| 3,170,883 A | 2/1965 | Owen et al. | |
| 3,328,294 A | 6/1967 | Self et al. | |
| 3,558,503 A | 1/1971 | Goodenough et al. | |
| 3,767,586 A | 10/1973 | Rutkiewic | |
| 4,465,598 A | 8/1984 | Darlington et al. | |
| 4,524,003 A * | 6/1985 | Borchardt | 507/211 |
| 4,701,247 A | 10/1987 | Kalnins et al. | |
| 4,822,513 A | 4/1989 | Corby | |
| 4,935,153 A | 6/1990 | Favstritsky et al. | |
| 4,995,987 A | 2/1991 | Whitekettle et al. | |
| 5,047,164 A | 9/1991 | Corby | |
| 5,054,552 A | 10/1991 | Hall et al. | |
| 5,141,652 A | 8/1992 | Moore, Jr. et al. | |
| 5,202,047 A | 4/1993 | Corby | |
| 5,443,849 A | 8/1995 | Corby | |
| 5,464,636 A | 11/1995 | Hight et al. | |
| 5,527,547 A | 6/1996 | Hight et al. | |
| 5,683,654 A | 11/1997 | Dallmier et al. | |
| 5,759,964 A | 6/1998 | Shuchart et al. | |
| 5,795,487 A | 8/1998 | Dallmier et al. | |
| 5,942,126 A | 8/1999 | Dallmier et al. | |
| 6,007,726 A | 12/1999 | Yang et al. | |
| 6,015,782 A | 1/2000 | Petri et al. | |
| 6,037,318 A | 3/2000 | Na et al. | |
| 6,068,861 A | 5/2000 | Moore, Jr. et al. | |
| 6,110,387 A | 8/2000 | Choudhury et al. | |
| 6,123,870 A | 9/2000 | Yang et al. | |
| 6,143,698 A * | 11/2000 | Murphey et al. | 507/145 |
| 6,156,229 A | 12/2000 | Yang et al. | |
| 6,162,371 A | 12/2000 | Rees et al. | |
| 6,192,985 B1 | 2/2001 | Hinkel et al. | |
| 6,229,909 B1 | 5/2001 | Tohyama | |
| 6,267,897 B1 | 7/2001 | Robertson et al. | |
| 6,270,722 B1 | 8/2001 | Yang et al. | |
| 6,287,473 B1 | 9/2001 | Yang et al. | |
| 6,299,909 B1 | 10/2001 | Moore, Jr. et al. | |
| 6,306,441 B1 | 10/2001 | Moore, Jr. et al. | |
| 6,322,822 B1 | 11/2001 | Moore, Jr. et al. | |
| 6,342,467 B1 | 1/2002 | Chang et al. | |
| 6,375,991 B1 * | 4/2002 | Moore, Jr. | 424/703 |
| 6,447,722 B1 | 9/2002 | Rakestraw | |
| 6,506,418 B1 * | 1/2003 | McKinnie et al. | 424/703 |
| 2003/0104074 A1 * | 6/2003 | Moore et al. | 424/661 |
| 2004/0022874 A1 * | 2/2004 | Nalepa et al. | 424/723 |
| 2004/0120853 A1 * | 6/2004 | Carpenter et al. | 422/37 |
| 2005/0147696 A1 * | 7/2005 | Moore et al. | 424/723 |
| 2006/0073216 A1 * | 4/2006 | McNaughton | 424/661 |

FOREIGN PATENT DOCUMENTS

| | | |
|---|---|---|
| WO | WO-90/15780 | 12/1990 |
| WO | WO-99/06320 | 2/1999 |
| WO | WO-99/32596 | 7/1999 |
| WO | WO-99/55627 | 11/1999 |
| WO | WO-00/34186 | 6/2000 |
| WO | WO 02/079105 A1 | 10/2002 |
| WO | WO 2004/039159 A1 | 5/2004 |

OTHER PUBLICATIONS

Kim, Yong H., "Evaluation of Redox Potential and Chlorine Residual as a Measure of Water Disinfection", IWC-93-22, Engineers Society of Western Pennsylvania, Pittsburgh PA, 1993, pp. 108-113.
McCune, Conwell C., "Seawater Injection Experience—An Overview", Journal of Petroleum Technology, Oct. 1982, pp. 2265-2270.
Mitchell, R.W., "The Forties Field Sea-Water Injection System", Journal of Petroleum Technology, Jun. 1978, pp. 877-884.

* cited by examiner

Primary Examiner—Philip C. Tucker
(74) Attorney, Agent, or Firm—Marcy M. Hoefling

(57) ABSTRACT

A process for reducing the viscosity of fracturing fluids in downhole oilfield operations is provided. The process comprises contacting a sulfamate stabilized, bromine-based breaker with an aqueous polysaccharide fracturing fluid, with the breaker present in an amount to reduce the viscosity of the fracturing fluid. A composition which comprises a sulfamate stabilized, bromine-based breaker for use in decreasing the viscosity of an aqueous polysaccharide fracturing fluid for use in subterranean oil and gas wells is also provided.

24 Claims, No Drawings

BREAKER COMPOSITION AND PROCESS

TECHNICAL FIELD

This invention relates to a breaker for effecting viscosity decreases in aqueous fracturing fluids generally used in the workover of subterranean oil and gas wells. The invention relates to a new breaker composition that provides effective viscosity decreases in such oil and gas well activities.

BACKGROUND

Breakers (often referred to as breaker fluids) are often used in the oil or gas field for decreasing the viscosity of oilfield fracturing fluids after the fracturing is completed. While breakers that reduce viscosity in downhole operations are available, further improvements in performance are desired. For example, a breaker fluid that could provide a controlled rate of viscosity decay would be of considerable advantage.

Breakers can be mixed with the fracturing fluid, or added later as needed. It is preferable to mix the breaker (fluid) with the fracturing fluid; however, it is disadvantageous to mix some of the known breakers with the fracturing fluid. Also, some breakers, particularly bleach, corrode metal pipe, which is normally used in drilling, workover, and completion operations. It would be especially advantageous if the breaker fluid in addition to providing a controlled rate of viscosity decay, would cause minimal corrosion of metal pipes, and could be mixed with the fracturing fluid.

SUMMARY OF THE INVENTION

This invention enables the achievement of most, if not all, of the above desirable advantages in a highly cost-effective manner. The breaker composition provided by this invention causes minimal corrosion of metal pipe. Breaker compositions of this invention work over a wider pH range than do those that are chlorine-based. Further, some of the breaker compositions provided by the invention can give a controlled rate of viscosity decay, and thus can be mixed with the oilfield fracturing fluid without significant premature viscosity decreases of the fracturing fluid, which in turn avoids a second treatment to break the fracturing fluid polymer, thereby saving rig time and handling equipment. Surprisingly, the rate of viscosity decay can be controlled by pH adjustments when using a breaker composition of this invention.

Provided by this invention is a process which comprises contacting a sulfamate stabilized, bromine-based breaker with an aqueous polysaccharide fracturing fluid. The fracturing fluid is for use in subterranean oil and gas wells, primarily during workover, and the breaker is present in an amount to reduce the viscosity of the fracturing fluid. Preferably, the breaker is formed from (A) a halogen source which is (i) bromine chloride, (ii) bromine and chlorine, (iii) bromine, or (iv) a mixture of any two or more of (i), (ii), and (iii), (B) a source of sulfamate anions, (C) alkali metal base, and (D) water, in amounts that the breaker has an active bromine content of at least 50,000 ppm, and an atom ratio of nitrogen to active bromine originating from (A) and (B) that is greater than about 0.93.

Also provided by this invention is a composition for use in decreasing the viscosity of aqueous polysaccharide fracturing fluids, which are generally used in the workover of subterranean oil and gas wells. The composition is comprised of a sulfamate stabilized, bromine-based breaker. In preferred embodiments of this invention, the breaker composition is formed from (A) a halogen source which is (i) bromine chloride, (ii) bromine and chlorine, (iii) bromine, or (iv) a mixture of any two or more of (i), (ii), and (iii), (B) a source of sulfamate anions, (C) alkali metal base, and (D) water, in amounts that the breaker has an active bromine content of at least 50,000 ppm, and an atom ratio of nitrogen to active bromine originating from (A) and (B) that is greater than about 0.93.

Preferred breakers are those in which the halogen source is bromine chloride, bromine and chlorine, or a mixture of bromine chloride and bromine, and the alkali metal base is a sodium or potassium base. More preferred breakers are those wherein the halogen source consists essentially of bromine chloride, wherein the alkali metal base is a sodium base, wherein the active bromine content of the breaker is at least 100,000 ppm, the above atom ratio of nitrogen to active bromine originating from (A) and (B) is at least about 1, and/or the pH of the breaker is at least about 12. Still more preferred are breakers which have two or more of these preferred characteristics; highly preferred is a breaker that has all of the foregoing preferred characteristics. Particularly preferred breakers are those wherein the halogen source consists essentially of bromine chloride, wherein the alkali metal base is sodium hydroxide, wherein the active bromine content of the breaker is at least 140,000 ppm, the above atom ratio of nitrogen to active bromine originating from (A) and (B) is at least about 1.1, and/or the pH of the breaker is at least about 13. More particularly preferred are breakers that have at least two of these particularly preferred characteristics; the most highly preferred breaker has all of these particularly preferred characteristics.

Also more preferred breakers for use in this invention are highly concentrated aqueous sulfamate-stabilized active bromine compositions which are solids-free aqueous solutions or solids-containing slurries formed as above, and in which the content of dissolved active bromine is greater than about 160,000 ppm. In the preferred aqueous solutions of this type, the active bromine in these preferred breakers is all in solution at room temperature (e.g., 23° C.). In one particularly preferred embodiment the content of active bromine in such aqueous breaker solutions (whether formed from use of (a) BrCl, or (b) $Br_2$, or (c) BrCl and $Br_2$, or (d) $Br_2$ and $Cl_2$, or (e) BrCl, $Br_2$ and $Cl_2$) is in the range of about 176,000 ppm to about 190,000 ppm (wt/wt). In another particularly preferred embodiment the content of active bromine in such aqueous breaker solutions (whether formed from use of (a) BrCl, or (b) $Br_2$, or (c) BrCl and $Br_2$, or (d) $Br_2$ and $Cl_2$, or (e) BrCl, $Br_2$ and $Cl_2$) is in the range of from about 201,000 ppm to about 215,000 ppm.

Also suitable for use in this invention is a solid state bromine-containing breaker formed by removal of water from an aqueous solution or slurry of a product formed in water from (I) a halogen source which is (i) bromine, (ii) bromine chloride, (iii) a mixture of bromine chloride and bromine, (iv) bromine and chlorine in a $Br_2$ to $Cl_2$ molar ratio of at least about 1, or (v) bromine chloride, bromine, and chlorine in proportions such that the total $Br_2$ to $Cl_2$ molar ratio is at least about 1; and (II) a source of overbased sulfamate which is (i) an alkali metal salt of sulfamic acid and/or sulfamic acid, and (ii) an alkali metal base, wherein said aqueous solution or slurry has a pH of at least 7, preferably above 10 and more preferably above 12, and an atom ratio of nitrogen to active bromine from (I) and (II) of greater than 0.93. The concentration of the product formed in water from (I) and (II) used in forming the solid state bromine-containing breaker is not critical; any concentration can be present in the initial aqueous solution or slurry. Naturally it is desirable to start with a more concentrated solution or slurry as this lessens the amount of water that must be removed when preparing the solid state bromine-containing breaker.

The solid state bromine-containing breakers of this invention are preferably formed by spray drying the aqueous solution or slurry of the product formed from (I) and (II) above. Temperatures of the atmosphere (e.g., dry air or nitrogen) into which the spray is directed is typically in the range of about 20 to about 100° C., and preferably is in the range of about 20 to about 60° C., particularly when the process is carried out at reduced pressure. When spray drying is used it is preferred to use the product formed from (I) and (II) as a solution rather than as a slurry as this minimizes the possibility of nozzle pluggage. On the other hand, if the water is to be flashed off or otherwise distilled from the solution or slurry of the product formed from (I) and (II), it is preferred to use the product formed from (I) and (II) as a slurry rather than as a solution as this minimizes the amount of water to be removed. Such flashing or distillations can be, and preferably are, conducted at reduced pressures to reduce the temperatures to which the product formed from (I) and (II) is exposed during drying.

The solid state bromine-containing breakers of this invention are typically in the form of powders or relatively small particles. However the solid state bromine-containing breakers of this invention can be compacted into larger forms such as nuggets, granules, pellets, tablets, pucks, and the like, by use of known procedures. Such compacted products may be formed with the use of binding agents or other materials that cause the particles to adhere one to another. If the binder used is not readily soluble in water, it is important not to totally encapsulate the product with a water-impervious coating of such binder that remains intact under actual use conditions, as this would prevent contact between the encapsulated bromine-containing breaker and the water being treated with the breaker. Low melting waxes or the like may be used to bind and even to encapsulate the bromine-containing breaker in cases where the encapsulated product is used in waters at high enough temperatures to melt off the coating and bindings so that the water can come into contact with the previously encased breaker itself. However, use of binding substances that are water-soluble or that provide effective binding action in proportions insufficient to encapsulate the particles being bound together, is preferable. The binding agent used should be compatible with the solid state bromine-containing breaker of this invention.

These and other embodiments and features of this invention will be still further apparent from the ensuing description and appended claims.

FURTHER DETAILED DESCRIPTION OF THE INVENTION

The breakers used in the practice of this invention are known. Methods for their preparation are given, for example, in U.S. Pat. Nos. 3,558,503; 6,068,861; 6,110,387; 6,299,909 B1; 6,306,441 B1; and 6,322,822 B1.

Generally, there are two methods for combining the fracturing fluid and the breaker. In one method, the breaker is mixed with the fracturing fluid prior to sending the fracturing fluid downhole. This method is favored at least because of convenience—it is easier to mix the fluids at the surface and send one mixture downhole. A disadvantage of this blending method is that the breaker can decrease the viscosity of the fracturing fluid before the desired time. In another method, the fracturing fluid is is sent downhole, and the breaker is sent downhole later. While sending the breaker downhole later is inconvenient, in this method the breaker does not decrease the viscosity of the fracturing fluid prematurely.

The breakers of the present invention are suitable for use in either method for combining the fracturing fluid and the breaker. For example, the viscosity of xanthan and simple guar fracturing fluids with pH 7 appear to be immediately broken by a breaker of the invention, which is useful when the breaker is sent downhole later (after the fracturing fluid). Breakers of the invention are also useful when the fracturing fluid and the breaker are combined before the fracturing fluid is sent downhole. As an example, a breaker of the invention breaks the viscosity of a pH 10.5 guar-viscosified fracturing fluid after a desirable time lag.

Blending of the breaker with the fracturing fluid can be conducted in any manner conventionally used in blending well fluids generally. Since the breakers, including the preferred breakers, whether formed on site or received from a manufacturer, are normally mobile aqueous solutions, the blending is rapid and facile. Simple metering or measuring devices and means for mixing or stirring the breaker with the fracturing fluid can thus be used, if desired. Periodically individual batches of fracturing fluids can be treated with the breaker and used so that the breaker is provided intermittently to the well. Preferably, however, all of the fracturing fluid used in a given operation is treated with a breaker of this invention so that the breaker is continuously being provided to the well.

Typically the amount of the breaker used should provide in the range of about 1 to about 10,000 ppm, and preferably in the range of about 100 to about 2000 ppm of active bromine species in the blended well fluid prior to well application. Departures from these ranges whenever deemed necessary or desirable are permissible and are within the scope of this invention.

The breaker is used in an amount sufficient to reduce the viscosity of the fracturing fluid, and preferably the viscosity is reduced to about the viscosity value of the fracturing fluid prior to the addition of the polysaccharide thickening agent. The amount of breaker needed often varies depending upon the temperature of the fracturing fluid, the concentration of the viscosifying polymer in the fracturing fluid, and the pH of the fracturing fluid.

While breakers made by use of bromine can be used (e.g. U.S. Pat. No. 3,558,503) as the sulfamate stabilized, bromine-based breakers of this invention, preferred breakers of this invention because of their effectiveness and stability are formed from bromine chloride, bromine and chlorine, or a mixture of bromine chloride and up to about 50 mole % of bromine. A particularly preferred breaker of this type for use in the practice of this invention is commercially available from Albemarle Corporation under the trademark WELLGUARD™ 7137. The sulfamate used in the production of such breaker products is effective in stabilizing the active bromine species over long periods of time, especially when the pH of the product is at least about 12 and preferably at least about 13. For example, WELLGUARD™ 7137 breaker is stable for greater than one year if protected from sunlight. For ease of reference, these preferred highly effective and highly stable breakers for use in the practice of this invention formed from bromine chloride, bromine and chlorine, or a mixture of bromine chloride and up to about 50 mole % of bromine, a sulfamate source such as sulfamic acid or sodium sulfamate, a sodium base, typically NaOH, and, normally, water are often referred to hereinafter collectively as "preferred breakers" or "the preferred breakers", and in the singular as "preferred breaker" or "the preferred breaker". The breaker of this invention is usually in liquid form, but, as described above, the breaker can be in the solid state. When in liquid form, the breaker of this invention may be referred to as a "breaker fluid".

Some components or impurities commonly encountered in or by aqueous well fluids are reactive with the breakers used pursuant to this invention. One such impurity is hydrogen sulfide. Another such impurity is oil, particularly hydrocarbonaceous oil. Such components are identifiable as substances which are reactive in aqueous media with monobromo alkali metal sulfamate, dibromo alkali metal sulfamate, or bromonium ions. When such components are present, their presence can be overcome provided the quantity of such components can be effectively overcome by use of a sacrificial quantity of a breaker used pursuant to this invention. Polyacrylamide and scale inhibitor are examples of potential additives or components of the aqueous well fluid. Such common well fluid components are surprisingly compatible with breakers employed in the practice and compositions of this invention. Starch, on the other hand, is an example of a potential well fluid component which is not necessarily compatible with breakers of this invention. The presence of starch and like components in the well fluid similarly may be overcome using a sacrificial quantity of the breaker. Thus, another embodiment of this invention is a process for effecting breaker activity in an aqueous well fluid that contains one or more components reactive with monobromo alkali metal sulfamate, dibromo alkali metal sulfamate or bromonium ions, which process comprises blending an aqueous breaker of this invention with the aqueous well fluid.

One of the advantages of using the preferred breakers is their great compatibility with other components used in downhole operations. For example, unlike HOBr and hypobromites, the preferred breakers do not oxidize or otherwise destroy organic phosphonates typically used as corrosion and scale inhibitors. In fact, the preferred breakers are compatible with polyacrylamide-containing slickwater fracturing fluids as long as they are devoid or substantially devoid of hydrogen sulfide. Hydrogen sulfide can react rapidly with the breakers used pursuant to this invention, including the preferred breakers. Therefore, if there is some hydrogen sulfide present in the aqueous fracturing fluid, it is preferred to determine analytically the amount of hydrogen sulfide that is present in the downhole solution. If the amount is sufficiently small that it does not require an excessive amount of the breaker to consume that amount of hydrogen sulfide, the amount of the breaker injected into the well should be sufficient not only to consume the hydrogen sulfide but additionally to provide a suitable residual quantity of active bromine in the well. Since at least the preferred breakers are highly cost-effective, it is economically feasible to sacrifice some of the breaker as a means of destroying the hydrogen sulfide so that the remainder of the breaker used can provide the appropriate amount of viscosity decrease to the fracturing fluid. Of course if the amount of hydrogen sulfide is so high as to make it non-feasible economically to destroy the hydrogen sulfide using the breaker, the use of the compositions of this invention in such well is not recommended. The dividing line as between how much hydrogen sulfide can be tolerated and consumed with extra breaker pursuant to this invention and how much makes it non-feasible to do so will vary depending upon a number of variable economic factors as well as technical factors. For example, such factors as operating costs, well location, particular breaker being used, and the amount of viscosity decrease needed or desired downhole can have a significant effect upon how much hydrogen sulfide can be tolerated in any given situation. Therefore, the amount of hydrogen sulfide that can be tolerated and overcome in the downhole aqueous fluid pursuant to this invention is subject to considerable latitude and cannot be universally quantified. Suffice it to say that the well being treated and/or the water used in forming the fracturing fluid should either be free of hydrogen sulfide or may contain in the downhole aqueous fluid a "consumable amount" of hydrogen sulfide. The "consumable amount" of hydrogen sulfide that can be tolerated can be, and should be, determined on a small scale experimentally before conducting a full scale operation.

As is known in the art, aqueous well fluids can contain various additive components including proppants such as calcium carbonate, and pecan shells; viscosity modifying agents such as ferrochrome lignosulfonate, calcium lignosulfonate, or sodium lignosulfonate; emulsifiers; surfactants; pH control agents; clay stabilizers; and the like, as long as such optional ingredients do not adversely affect the fracturing fluid and/or breaker. The aqueous well fluids can also optionally contain crosslinkers, including borates, chromates, titanates, zirconates, aluminates, and antimony crosslinking agents, and the like.

The fracturing fluids to which the breakers of this invention impart viscosity decreases are aqueous polysaccharide fracturing fluids, also known as gel-type fracturing fluids. Various gelation agents and crosslinking agents can be used as the polysaccharide thickening agent of the fracturing fluid. The fracturing fluid thickening agent can either be a synthetic polymer or a natural gum. Synthetic polymers include acrylic polymers, vinyl polymers, and cellulose derivatives. The synthetic polymers most frequently used are polyacrylamide and hydroxyethylcellulose. Polysaccharides which may be present in the fracturing fluids are the industrial gums such as those generally classified as exudate gums, seaweed gums, seed gums, microbial polysaccharides; and hemicelluloses (cell wall polysaccharides found in land plants) other than cellulose and pectins. These polysaccharides include xylan, mannan, galactan, L-arabino-xylans, L-arabino-D-glucurono-D-xylans; 40-methyl-D-glucurono-D-xylans, D-gluco-D-mannans; D-galacto-D-mannans and arabino-D-galactans, algin, such as sodium alginate, carrageenin, fucordan, laminaran, agar, gum arabic, gum ghatti, gum karaya, tamarind gum, tara, konjak, carrageenan, tragacanth gum, guar gum and derivatives thereof, xanthan gums, locust bean gums and the like. Modified gums such as carboxyalkyl derivatives (e.g., carboxymethyl guar and hydroxyalkyl derivatives, e.g., hydroxyethyl guar and hydroxypropyl guar) can also be employed. Modified celluloses and derivatives thereof can also be employed, for example, hydroxyethylcellulose, carboxymethylcellulose, and carboxymethylhydroxyethylcellulose, and the like. Natural gums, especially xanthan gum and guar gum, are preferred over the synthetic polymers.

The breakers of the invention can provide a controlled rate of viscosity decay, allowing the breaker to be mixed with the fracturing fluid, avoiding a second treatment (downhole) to break the fracturing fluid polymer. As stated before, the rate of viscosity decay can be controlled by pH adjustments when using a breaker of this invention. Thus usage of the breakers of this invention can shorten and simplify the wellhead operations in this regard.

Still another advantage of this invention is the very low corrosivity of the preferred breakers against metals, especially ferrous metals. This is the result of the low oxidation-reduction potential of the preferred breakers.

Yet another advantage of this invention is the stability of at least the preferred breakers at elevated temperatures. Thus unlike HOBr or hypobromite solutions which have relatively poor thermal stability at elevated temperatures, the preferred breakers can be used in very deep wells where highly elevated temperatures are encountered without premature decomposition.

Standard analytical test procedures are available enabling close approximation of "total bromine" and "free bromine" present in an aqueous breaker solution. For historical and customer familiarity reasons, these procedures actually express the results of the determinations as "free chlorine" and "total chlorine", which results can then be arithmetically converted to "total bromine" and "free bromine". The procedures are based on classical test procedures devised by Palin in 1974. See A. T. Palin, "Analytical Control of Water Disinfection With Special Reference to Differential DPD Methods For Chlorine, Chlorine Dioxide, Bromine, Iodine and Ozone", *J. Inst. Water Eng.*, 1974, 28, 139. While there are various modernized versions of the Palin procedures, the version of the tests for "free chlorine" and "total chlorine" recommended herein for use, are fully described in *Hach Water Analysis Handbook*, 3rd edition, copyright 1997. The procedure for "free chlorine" is identified in that publication as Method 8021 appearing on page 335, whereas the procedure for "total chlorine" is Method 8167 appearing at page 379. Briefly, the "free chlorine" test involves introducing to the halogenated water a powder comprising DPD indicator powder and a buffer. "Free chlorine" present in the water reacts with the DPD indicator to produce a red to pink coloration. The intensity of the coloration depends upon the concentration of "free chlorine" species present in the sample. This intensity is measured by a colorimeter calibrated to transform the intensity reading into a "free chlorine" value in terms of mg/L $Cl_2$. Similarly, the "total chlorine" test also involves use of DPD indicator and buffer. In this case, KI is present with the DPD and buffer whereby the halogen species present, including nitrogen-combined halogen, reacts with KI to yield iodine species which turn the DPD indicator to red/pink. The intensity of this coloration depends upon the sum of the "free chlorine" species and all other halogen species present in the sample. Consequently, this coloration is transformed by the calorimeter into a "total chlorine" value expressed as mg/L $Cl_2$.

In greater detail, these procedures are as follows:

1. To determine the amount of species present in the aqueous well fluid water which respond to the "free chlorine" and "total chlorine" tests, the sample should be analyzed within a few minutes of being taken, and preferably immediately upon being taken.
2. Hach Method 8021 for testing the amount of species present in the sample which respond to the "free chlorine" test involves use of the Hach Model DR 2010 colorimeter or equivalent. The stored program number for chlorine determinations is recalled by keying in "80" on the keyboard, followed by setting the absorbance wavelength to 530 nm by rotating the dial on the side of the instrument. Two identical sample cells are filled to the 10 mL mark with the aqueous sample under investigation. One of the cells is arbitrarily chosen to be the blank. Using the 10 mL cell riser, this is admitted to the sample compartment of the Hach Model DR 2010, and the shield is closed to prevent stray light effects. Then the ZERO key is depressed. After a few seconds, the display registers 0.00 mg/L $Cl_2$. To a second cell, the contents of a DPD Free Chlorine Powder Pillow are added. This is shaken for 10–20 seconds to mix, as the development of a pink-red color indicates the presence of species in the sample which respond positively to the DPD test reagent. Within one minute of adding the DPD "free chlorine" reagent to the 10 mL of aqueous sample in the sample cell, the blank cell used to zero the instrument is removed from the cell compartment of the Hach Model DR 2010 and replaced with the test sample to which the DPD "free chlorine" test reagent was added. The light shield is then closed as was done for the blank, and the READ key is depressed. The result, in mg/L $Cl_2$ is shown on the display within a few seconds. This is the "free chlorine" level of the water sample under investigation.
3. Hach Method 8167 for testing the amount of species present in the aqueous sample which respond to the "total chlorine" test involves use of the Hach Model DR 2010 calorimeter or equivalent. The stored program number for chlorine determinations is recalled by keying in "80" on the keyboard, followed by setting the absorbance wavelength to 530 nm by rotating the dial on the side of the instrument. Two identical sample cells are filled to the 10 mL mark with the water under investigation. One of the cells is arbitrarily chosen to be the blank. To the second cell, the contents of a DPD Total Chlorine Powder Pillow are added. This is shaken for 10–20 seconds to mix, as the development of a pink-red color indicates the presence of species in the water which respond positively to the DPD "total chlorine" test reagent. On the keypad, the SHIFT TIMER keys are depressed to commence a three-minute reaction time. After three minutes the instrument beeps to signal the reaction is complete. Using the 10 mL cell riser, the blank sample cell is admitted to the sample compartment of the Hach Model DR 2010, and the shield is closed to prevent stray light effects. Then the "ZERO" key is depressed. After a few seconds, the display registers 0.00 mg/L $Cl_2$. Then, the blank sample cell used to zero the instrument is removed from the cell compartment of the Hach Model DR 2010 and replaced with the test sample to which the DPD "total chlorine" test reagent was added. The light shield is then closed as was done for the blank, and the READ key is depressed. The result, in mg/L $Cl_2$ is shown on the display within a few seconds. This is the "total chlorine" level of the water sample under investigation.
4. To convert the readings to bromine readings, the "free chlorine" and the "total chlorine" values should be multiplied by 2.25 to provide the "free bromine" and the "total bromine" values.

Another procedure for measuring the total active halogen and bromine chloride (BrCl) content in a solution are as follows:

1. To determine the amount of species present in the aqueous well fluid water which respond to the "free chlorine" and "total chlorine" tests, the sample should be analyzed within a few minutes of being taken, and preferably immediately upon being taken.
2. Standardize a 0.1N sodium thiosulfate solution.
3. Accurately weigh a sample (about 0.2–0.5 g to the nearest 0.1 mg) into a 250 mL iodine flask containing 50 mL of acetic acid and a magnetic stir bar. Record the weight as A grams. Swirl to dissolve the sample, add 50 mL of distilled water and 25 mL of 15% KI solution. Stir for 15 minutes.

4. Titrate the sample with the standard 0.1N sodium thiosulfate. This can be done either potentiometrically using a platinum titrode to detect the first derivative endpoint, or visually to a faint yellow color. When the first derivative endpoint is reached, add 1 mL of starch solution and continue the dropwise addition of 0.1N sodium thiosulfate, while stirring, until the next addition discharges the blue color. Record the volume of sodium thiosulfate solution used as B mL. The average of at least two replications is reported. Agreement between the replications should be within ±5% relative. If agreement is greater than +5%, two more samples are run, and the average of all measurements is reported.
5. Determine a reagent blank value by repeating steps 3 & 4, except for weighing a sample. Record the volume as C mL.
6. The calculations are as follows:

$$\text{Total \% Active Halogen (as Bromine)} = \frac{(B \text{ mL} - C \text{ mL})(N \text{ sodium thiosulfate})(7.9904)}{A \text{ grams}}$$

where A grams=sample weight, B mL=titration volume for sample for total active halogen; and C mL=titration blank for total active halogen.

To convert to percent bromine chloride:

$$\% \text{ BrCl} = (\text{Total \% Active Halogen}) \times (115.35/159.81)$$

The fraction is the molecular weight of bromine chloride divided by the molecular weight of $Br_2$.

The following examples are presented for purposes of illustration, and are not intended to impose limitations on the scope of this invention.

In the Examples, a group of experiments was conducted on a laboratory scale using WELLGUARD™ 7137 (Albemarle Corporation) as the breaker. WELLGUARD™ 7137 is a sulfamate-stabilized, bromine-based breaker. More particularly, the activity of the WELLGUARD™ 7137 breaker being used was 10.8% or 108,000 ppm as BrCl (15.0% or 150,000 ppm as $Br_2$).

EXAMPLES

A stock solution of aqueous KCl (7 wt %) was prepared by stirring 271 g of KCl with 3600 mL of deionized water. A stock solution of aqueous KCl (7 wt %) with WELLGUARD™ 7137 was prepared by stirring 271 g of KCl with 3600 mL of deionized water and 12.3 grams of WELLGUARD™ 7137. The residual breaker was measured at 981 ppm as total $Br_2$. This value was used as the baseline at time=zero hours in Table 2. A mixer (Hamilton-Beach) was used for all stirring and shearing. The viscosity and bromine level were measured at regular intervals for each sample.

Brookfield viscosities were measured using spindle S-18 at ambient temperature (19–25° C.). Significant decreases in the viscosity were interpreted as breakdown of the polymer (here, xanthan or guar). Residuals of the breaker (WELLGUARD™ 7137) were measured at 3 minutes using the total chlorine reagent (DPD) with a hand-held spectrophotometer (Hach DR/2000); results are reported as total $Br_2$.

Example 1

Xanthan Gum

Two samples were made: one containing the WELLGUARD™ 7137 treatment, and a comparative sample not containing the WELLGUARD™ 7137 treatment. To prepare the comparative sample, some of the stock solution of 7% aqueous KCl (356 g) was acidified to pH 3.6 with dilute HCl (0.1 M). To this solution, xanthan (2.52 g; Kelco Kelzan XCD, CP Kelco) was added with stirring. This mixture was stirred for 3 minutes, neutralized to pH 7.1 with dilute aqueous $NaHCO_3$ (0.1 M), and then sheared for 1 minute more. The sample of the invention was prepared by acidifying some of the stock solution of aqueous KCl with WELLGUARD™ 7137 (357 g) to pH 4.5 with dilute HCl (0.1 M). To this solution, xanthan (2.52 g; Kelco Kelzan XCD) was added with stirring. This mixture was stirred for 3 minutes, neutralized to pH 7.1 with dilute aqueous $NaHCO_3$ (0.1 M), and then sheared for 1 minute more.

Table 1 summarizes the viscosity time dependence for these well fluids. In the xanthan fluid, WELLGUARD™ 7137 knocked down the viscosity relatively quickly. One possible explanation for the slight increase in viscosity between hour 4 and hour 22 is continued hydration of the xanthan polymer. Table 2 summarizes the time dependence of the presence of residual WELLGUARD™ 7137, measured as total $Br_2$, using a DPD assay. In the xanthan fluid, the residual decay is immediate: it plateaus and ceases to change significantly. Conditions for the xanthan system were not optimized.

Example 2

Guar Gum

Two samples were made: one containing the WELLGUARD™ 7137 treatment, and a comparative sample not containing the WELLGUARD™ 7137 treatment. To prepare the comparative sample, some of the stock solution of 7% aqueous KCl (357 g) was sheared for 3 minutes with guar (1.86 g; Chemplex Industries, Inc.). This mixture was heated to 120° F. (49° C.), and kept at this temperature for the duration of the study. The sample of the invention was prepared by shearing some of the stock solution of aqueous KCl with WELLGUARD™ 7137 (355 g) with guar (1.86 g; Chemplex) for 3 minutes. This mixture was heated to 120° F. (49° C.), and kept at this temperature for the duration of the study.

Table 1 summarizes the viscosity time dependence for these well fluids. In this guar system, WELLGUARD™ 7137 appeared to have completely broken the polymer already at hour 22. Table 2 summarizes the time dependence of the presence of residual WELLGUARD™ 7137, measured as total $Br_2$. In this guar well fluid, the residual decay appears to occur quickly.

Example 3

Guar Gum; pH Adjusted to 10.5

Two samples were made: one containing the WELLGUARD™ 7137 treatment, and a comparative sample not containing the WELLGUARD™ 7137 treatment. To prepare the comparative sample, some of the stock solution of 7% aqueous KCl (355 g) was basified to pH 10.5 with $Na_2CO_3$. This solution was sheared for 3 minutes with guar (3.36 g; Chemplex). This mixture was heated to 120° F. (49° C.), and kept at this temperature for the duration of the study. The sample of the invention was prepared by basifying some of the stock solution of aqueous KCl with WELLGUARD™ 7137 (355 g) to pH 10.5 with dilute aqueous $Na_2CO_3$ (0.1 M). This solution was sheared with guar (3.36 g; Chemplex Industries, Inc.) for 3 minutes. This mixture was heated to 120° F. (49° C.), and kept at this temperature for the duration of the study.

Table 1 summarizes the viscosity time dependence for these well fluids. In the inventive well fluid, the viscosity decay at hour 22 was minimal, but by hour 146 the viscosity decay was significant. Table 2 summarizes the time dependence of the presence of residual WELLGUARD™ 7137, measured as total $Br_2$. In this guar well fluid, the residual decay also to be relatively rapid. Variables for this guar system were not optimized.

TABLE 1

| Ex. | Polymer | Breaker | 4 hr. | 22 hr. | 146 hr. | 242 hr. |
| --- | --- | --- | --- | --- | --- | --- |
| 1a* | xanthan | none | 715 cP | 803 cP | 1900 cP | 1780 cP |
| 1b | xanthan | WELLGUARD ™ 7137 | 116 cP | 229 cP | 195 cP | 215 cP |
| 2a* | guar | none | — | 37 cP | 13.1 cP | 12.7 cP |
| 2b | guar | WELLGUARD ™ 7137 | — | 1.23 cP | 1.23 cP | 1.41 cP |
| 3a* | guar, pH 10.5 | none | — | 189 cP | 121 cP | 128 cP |
| 3b | guar, pH 10.5 | WELLGUARD ™ 7137 | — | 164 cP | 14.5 cP | 10.2 cP |

*Comparative examples

TABLE 2

| Ex | Polymer | Breaker | 0 hr. | 22 hr. | 146 hr. | 242 hr. |
| --- | --- | --- | --- | --- | --- | --- |
| 1b | xanthan | WELLGUARD ™ 7137 | 981 ppm as $Br_2$ | 651 ppm as $Br_2$ | 446 ppm as $Br_2$ | 395 ppm as $Br_2$ |
| 2b | guar | WELLGUARD ™ 7137 | 981 ppm as $Br_2$ | 33 ppm as $Br_2$ | 1.2 ppm as $Br_2$ | 1.8 ppm as $Br_2$ |
| 3b | guar, pH 10.5 | WELLGUARD ™ 7137 | 981 ppm as $Br_2$ | 4 ppm as $Br_2$ | 2 ppm as $Br_2$ | 1.6 ppm as $Br_2$ |

Further embodiments of the invention include:

aa) A process which comprises contacting a sulfamate stabilized, bromine-based breaker with an aqueous polysaccharide fracturing fluid for use in subterranean oil and gas wells, with said breaker in such amount to reduce the viscosity of said fracturing fluid, wherein said active bromine content of the breaker is at least 100,000 ppm.

ab) A process which comprises contacting a sulfamate stabilized, bromine-based breaker with an aqueous polysaccharide fracturing fluid for use in subterranean oil and gas wells, with said breaker in such amount to reduce the viscosity of said fracturing fluid, wherein the amount of said breaker used provides in the range of about 1 to about 10,000 ppm of active bromine species in the blended well fluid prior to well application.

ac) A process which comprises contacting a sulfamate stabilized, bromine-based breaker with an aqueous polysaccharide fracturing fluid for use in subterranean oil and gas wells, with said breaker in such amount to reduce the viscosity of said fracturing fluid, wherein said breaker is formed from (A) a halogen source which is (i) bromine chloride, (ii) bromine and chlorine, (iii) bromine, or (iv) a mixture of any two or more of (i), (ii), and (iii),
(B) a source of sulfamate anions,
(C) alkali metal base, and
(D) water,
in amounts such that the breaker has an active bromine content of at least 50,000 ppm, and an atom ratio of nitrogen to active bromine originating from (A) and (B) that is greater than about 0.93.

ad) A process as in ac) wherein said halogen source is bromine chloride, bromine and chlorine, or a mixture of bromine chloride and bromine.

ae) A process as in to ac) wherein the content of dissolved active bromine in said breaker is greater than about 160,000 ppm.

af) A process as in ac) wherein the content of dissolved active bromine in said breaker is in the range of about 176,000 ppm to about 190,000 ppm.

ag) A process according to ac) wherein the content of dissolved active bromine in said breaker is in the range of about 201,000 ppm to about 215,000 ppm.

ah) A process as in ac) wherein said halogen source consists essentially of bromine chloride, and wherein said alkali metal base is a sodium base.

ai) A process as in to ac) wherein said halogen source consists essentially of bromine chloride, and wherein said active bromine content of the breaker is at least 100,000 ppm.

aj) A process as in ac) wherein said active bromine content of the breaker is at least 100,000 ppm, and wherein said atom ratio of nitrogen to active bromine originating from (A) and (B) is at least about 1.

ak) A process as in ac) wherein said halogen source consists essentially of bromine chloride, and wherein the pH of the breaker is at least about 12.

al) A process as in ac) wherein said halogen source consists essentially of bromine chloride, and said atom ratio of nitrogen to active bromine originating from (A) and (B) is at least about 1.

am) A process as in ac) wherein said halogen source consists essentially of bromine chloride, wherein said active bromine content of the breaker is at least 100,000 ppm, and wherein said atom ratio of nitrogen to active bromine originating from (A) and (B) is at least about 1.

an) A process as in ac) wherein said halogen source consists essentially of bromine chloride, wherein said alkali metal base is a sodium base, and wherein said active bromine content of the breaker is at least 100,000 ppm.

ao) A process as in ac) wherein said alkali metal base is a sodium base, wherein said active bromine content of the breaker is at least 100,000 ppm, and wherein said atom ratio of nitrogen to active bromine originating from (A) and (B) is at least about 1.

ap) A process as in ac) wherein said halogen source consists essentially of bromine chloride, wherein said alkali metal base is a sodium base, and wherein the pH of the breaker is at least about 12.

aq) A process as in any of ac), ah), or an)–ap) wherein said alkali metal base is sodium hydroxide.

ar) A process as in ac) wherein said halogen source consists essentially of bromine chloride, and wherein said active bromine content of the breaker is at least 140,000 ppm.

as) A process as in ac) wherein said halogen source consists essentially of bromine chloride, and wherein said atom ratio of nitrogen to active bromine originating from (A) and (B) is at least about 1.1.

at) A process as in ac) wherein said halogen source consists essentially of bromine chloride, and wherein the pH of the breaker is at least about 13.

au) A process as in ac) wherein said halogen source consists essentially of bromine chloride, wherein said active bromine content of the breaker is at least 140,000 ppm, and wherein said atom ratio of nitrogen to active bromine originating from (A) and (B) is at least about 1.1.

av) A process as in ac) wherein said active bromine content of the breaker is at least 140,000 ppm, and wherein said atom ratio of nitrogen to active bromine originating from (A) and (B) is at least about 1.1.

aw) A process as in ac) wherein said active bromine content of the breaker is at least 140,000 ppm, wherein said atom ratio of nitrogen to active bromine originating from (A) and (B) is at least about 1.1, and wherein the pH of the breaker is at least about 13.

ax) A process as in ac) wherein said atom ratio of nitrogen to active bromine originating from (A) and (B) is at least about 1.1, and wherein the pH of the breaker is at least about 13.

ay) A process according to ac) wherein said active bromine content of the breaker is at least 140,000 ppm.

az) A process according to ac) wherein said atom ratio of nitrogen to active bromine originating from (A) and (B) is at least about 1.1.

ba) A process according to ac) wherein the pH of the breaker is at least about 13.

bb) A composition for use in decreasing the viscosity of an aqueous polysaccharide fracturing fluid for use in subterranean oil and gas wells, said composition being comprised of a sulfamate stabilized, bromine-based breaker, wherein said active bromine content of the breaker is at least 100,000 ppm.

bc) A composition for use in decreasing the viscosity of an aqueous polysaccharide fracturing fluid for use in subterranean oil and gas wells, said composition being comprised of a sulfamate stabilized, bromine-based breaker, wherein said breaker is formed from (A) a halogen source which is (i) bromine chloride, (ii) bromine and chlorine, (iii) bromine, or (iv) a mixture of any two or more of (i), (ii), and (iii), (B) a source of sulfamate anions, (C) alkali metal base, and (D) water, in amounts such that the breaker has an active bromine content of at least 50,000 ppm, and an atom ratio of nitrogen to active bromine originating from (A) and (B) that is greater than about 0.93.

bd) A composition as in bc) wherein said halogen source is bromine chloride, bromine and chlorine, or a mixture of bromine chloride and bromine.

be) A composition as in to bc) wherein the content of dissolved active bromine in said breaker is greater than about 160,000 ppm.

bf) A composition as in bc) wherein the content of dissolved active bromine in said breaker is in the range of about 176,000 ppm to about 190,000 ppm.

bg) A composition according to bc) wherein the content of dissolved active bromine in said breaker is in the range of about 201,000 ppm to about 215,000 ppm.

bh) A composition as in bc) wherein said halogen source consists essentially of bromine chloride, and wherein said alkali metal base is a sodium base.

bi) A composition as in to bc) wherein said halogen source consists essentially of bromine chloride, and wherein said active bromine content of the breaker is at least 100,000 ppm.

bj) A composition as in bc) wherein said active bromine content of the breaker is at least 100,000 ppm, and wherein said atom ratio of nitrogen to active bromine originating from (A) and (B) is at least about 1.

bk) A composition as in bc) wherein said halogen source consists essentially of bromine chloride, and wherein the pH of the breaker is at least about 12.

bl) A composition as in bc) wherein said halogen source consists essentially of bromine chloride, and said atom ratio of nitrogen to active bromine originating from (A) and (B) is at least about 1.

bm) A composition as in bc) wherein said halogen source consists essentially of bromine chloride, wherein said active bromine content of the breaker is at least 100,000 ppm, and wherein said atom ratio of nitrogen to active bromine originating from (A) and (B) is at least about 1.

bn) A composition as in bc) wherein said halogen source consists essentially of bromine chloride, wherein said alkali metal base is a sodium base, and wherein said active bromine content of the breaker is at least 100,000 ppm.

bo) A composition as in bc) wherein said alkali metal base is a sodium base, wherein said active bromine content of the breaker is at least 100,000 ppm, and wherein said atom ratio of nitrogen to active bromine originating from (A) and (B) is at least about 1.

bp) A composition as in bc) wherein said halogen source consists essentially of bromine chloride, wherein said alkali metal base is a sodium base, and wherein the pH of the breaker is at least about 12.

bq) A composition as in any of bc), bh), or bn)-bp) wherein said alkali metal base is sodium hydroxide.

br) A composition as in bc) wherein said halogen source consists essentially of bromine chloride, and wherein said active bromine content of the breaker is at least 140,000 ppm.

bs) A composition as in bc) wherein said halogen source consists essentially of bromine chloride, and wherein said atom ratio of nitrogen to active bromine originating from (A) and (B) is at least about 1.1.

bt) A composition as in bc) wherein said halogen source consists essentially of bromine chloride, and wherein the pH of the breaker is at least about 13.

bu) A composition as in bc) wherein said halogen source consists essentially of bromine chloride, wherein said active bromine content of the breaker is at least 140,000 ppm, and wherein said atom ratio of nitrogen to active bromine originating from (A) and (B) is at least about 1.1.
bv) A composition as in bc) wherein said active bromine content of the breaker is at least 140,000 ppm, and wherein said atom ratio of nitrogen to active bromine originating from (A) and (B) is at least about 1.1.
bw) A composition as in bc) wherein said active bromine content of the breaker is at least 140,000 ppm, wherein said atom ratio of nitrogen to active bromine originating from (A) and (B) is at least about 1.1, and wherein the pH of the breaker is at least about 13.
bx) A composition as in bc) wherein said atom ratio of nitrogen to active bromine originating from (A) and (B) is at least about 1.1, and wherein the pH of the breaker is at least about 13.
by) A composition according to bc) wherein said active bromine content of the breaker is at least 140,000 ppm.
bz) A composition according to bc) wherein said atom ratio of nitrogen to active bromine originating from (A) and (B) is at least about 1.1.
ca) A composition according to bc) wherein the pH of the breaker is at least about 13.
cb) A process as in ab) wherein said breaker used provides in the range of about 100 to about 2000 ppm of active bromine species in the blended well fluid prior to well application.

It is to be understood that the reactants and components referred to by chemical name or formula anywhere in this document, whether referred to in the singular or plural, are identified as they exist prior to coming into contact with another substance referred to by chemical name or chemical type (e.g., another reactant, a solvent, or etc.). It matters not what preliminary chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together in connection with performing a desired chemical operation or reaction or in forming a mixture to be used in conducting a desired operation or reaction. Also, even though an embodiment and/or the claims may refer to substances, components and/or ingredients in the present tense ("is comprised of", "comprises", "is", etc.), the reference is to the substance, component or ingredient as it existed at the time just before it was first contacted, blended or mixed with one or more other substances, components and/or ingredients in accordance with the present disclosure.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

Each and every patent or other publication or published document referred to in any portion of this specification is incorporated in toto into this disclosure by reference, as if fully set forth herein.

This invention is susceptible to considerable variation within the spirit and scope of the appended claims.

What is claimed is:

1. A process which comprises contacting a sulfamate stabilized, bromine-based breaker with an aqueous polysaccharide fracturing fluid for use in subterranean oil and gas wells, wherein said breaker is present in an amount to reduce the viscosity of said fracturing fluid, and wherein either individual batches of said fracturing fluid are periodically treated with said breaker so that said breaker is provided intermittently to the well or all of said fracturing fluid used in a given operation is treated with said breaker so that said breaker is continuously provided to the well.

2. A process according to claim 1 wherein said breaker is formed from bromine chloride, bromine and chlorine, or a mixture of bromine chloride and up to about 50 mole % of bromine.

3. A process according to claim 1 wherein said breaker is formed from
   (A) a halogen source which is (i) bromine chloride, (ii) bromine and chlorine, (iii) bromine, or (iv) a mixture of any two or more of (i), (ii), and (iii),
   (B) a source of sulfamate anions,
   (C) alkali metal base, and
   (D) water,
in amounts such that the breaker has an active bromine content of at least 50,000 ppm, and an atom ratio of nitrogen to active bromine originating from (A) and (B) that is greater than about 0.93.

4. A process according to claim 3 wherein said alkali metal base is a sodium or potassium base.

5. A process according to claim 3 wherein said halogen source is bromine chloride, bromine and chlorine, or a mixture of bromine chloride and bromine, and wherein said alkali metal base is a sodium or potassium base.

6. A process according to claim 3 wherein said halogen source consists essentially of bromine chloride.

7. A process according to claim 3 wherein said alkali metal base is a sodium base.

8. A process according to claim 3 wherein said active bromine content of the breaker is at least 100,000 ppm.

9. A process according to claim 3 wherein said atom ratio of nitrogen to active bromine originating from (A) and (B) is at least about 1.

10. A process according to claim 3 wherein the pH of the breaker is at least about 12.

11. A process according to claim 3 wherein said halogen source consists essentially of bromine chloride; wherein said alkali metal base is a sodium base; wherein said active bromine content of the breaker is at least 100,000 ppm; wherein said atom ratio of nitrogen to active bromine originating from (A) and (B) is at least about 1; and wherein the pH of the breaker is at least about 12.

12. A process according to claim 3 wherein said halogen source consists essentially of bromine chloride, wherein the alkali metal base is sodium hydroxide, wherein the active bromine content of the breaker is at least 140,000 ppm, the above atom ratio of nitrogen to active bromine originating from (A) and (B) is at least about 1.1, and the pH of the breaker is at least about 13.

13. A process according to claim 1 wherein said breaker is a solid-state composition formed by removal of water from an aqueous solution or slurry of a product formed in water from
   (I) a halogen source which is (i) bromine, (ii) bromine chloride, (iii) a mixture of bromine chloride and bromine, (iv) bromine and chlorine in a $Br_2$ to $Cl_2$ molar ratio of at least about 1, or (v) bromine chloride, bromine, and chlorine in proportions such that the total $Br_2$ to $Cl_2$ molar ratio is at least about 1; and (II) a source of overbased sulfamate which is (i) an alkali metal salt of sulfamic acid and/or sulfamic acid, and (ii) an alkali metal base, wherein said aqueous solution or slurry has a pH of at least 7, and an atom ratio of nitrogen to active bromine from (I) and (II) of greater than 0.93.

14. A process according to claim 1 wherein all of the fracturing fluid used in a given operation is treated with said breaker so that said breaker is continuously provided to the well.

15. A process according to claim 1 wherein individual batches of fracturing fluids are periodically treated with said breaker so that said breaker is provided intermittently to the well.

16. A process according to claim 1 wherein the amount of said breaker used provides in the range of about 1 to about 10,000 ppm of active bromine species in the fracturing fluid prior to well application.

17. A process as in claim 1 wherein said fracturing fluid comprises a gel-type fracturing fluid.

18. A process as in claim 17 wherein said fracturing fluid comprises a xanthan gum or a guar gum.

19. A process as in claim 3 wherein said fracturing fluid comprises a gel-type fracturing fluid.

20. A process as in claim 19 wherein said fracturing fluid comprises a xanthan gum or a guar gum.

21. A process according to claim 3 wherein said halogen source is (i) bromine chloride, (ii) bromine and chlorine, or a mixture of bromine chloride and bromine, wherein said alkali metal base is a sodium or potassium base, and wherein said fracturing fluid comprises a xanthan gum or a guar gum.

22. A process according to claim 3 wherein said halogen source consists essentially of bromine chloride; wherein said alkali metal base is a sodium base; wherein said active bromine content of the breaker is at least 100,000 ppm; wherein said atom ratio of nitrogen to active bromine originating from (A) and (B) is at least about 1; wherein the pH of the breaker is at least about 12; and wherein said fracturing fluid comprises a xanthan gum or a guar gum.

23. A process according to claim 3 wherein said halogen source consists essentially of bromine chloride, wherein the alkali metal base is sodium hydroxide, wherein the active bromine content of the breaker is at least 140,000 ppm, the above atom ratio of nitrogen to active bromine originating from (A) and (B) is at least about 1.1, the pH of the breaker is at least about 13; and wherein said fracturing fluid comprises a xanthan gum or a guar gum.

24. A process according to claim 1 wherein the amount of said breaker used provides in the range of about 100 to about 2000 ppm of active bromine species in the blended well fluid prior to well application.

* * * * *